US009051157B2

(12) United States Patent
Breidenstein et al.

(10) Patent No.: US 9,051,157 B2
(45) Date of Patent: Jun. 9, 2015

(54) ELEVATOR DRIVE (71) Applicants: Olaf Breidenstein, Vellmar (DE);
Jochen Schulze, Reutlingen (DE);
Eberhard Vogler, Neuhausen (DE);
Andreas Wilhelm, Waschenbeuren (DE); Torsten Gessner, Ratingen (DE);
Gunther Hermann, Lichtenwald (DE);
Markus Jetter, Filderstadt (DE);
Nils-Anton Mollgaard, Schorndorf (DE); Uwe Resag, Aichtal (DE)

(72) Inventors: Olaf Breidenstein, Vellmar (DE);
Jochen Schulze, Reutlingen (DE);
Eberhard Vogler, Neuhausen (DE);
Andreas Wilhelm, Waschenbeuren (DE); Torsten Gessner, Ratingen (DE);
Gunther Hermann, Lichtenwald (DE);
Markus Jetter, Filderstadt (DE);
Nils-Anton Mollgaard, Schorndorf (DE); Uwe Resag, Aichtal (DE)

(73) Assignee: THYSSENKRUPP ELEVATOR AG, Dusseldorf (DE)

( * ) Notice: Subject to any disclaimer, the term of this patent is extended or adjusted under 35 U.S.C. 154(b) by 0 days.

(21) Appl. No.: 13/733,794

(22) Filed: Jan. 3, 2013

(65) Prior Publication Data
US 2014/0020985 A1    Jan. 23, 2014

Related U.S. Application Data (62) Division of application No. 12/225,163, filed as application No. PCT/EP2007/002251 on Mar. 14, 2007.

(30) Foreign Application Priority Data

Mar. 16, 2006 (EP) ...................................... 06005374

(51) Int. Cl.
| B66B 1/00 | (2006.01) |
| B66B 5/16 | (2006.01) |
| H02K 16/04 | (2006.01) |
| H02P 25/22 | (2006.01) |
| H02P 27/06 | (2006.01) |

(Continued)

(52) U.S. Cl.
CPC ... B66B 5/16 (2013.01); H02K 3/28 (2013.01); H02K 11/0073 (2013.01); H02K 16/04 (2013.01); H02K 2201/15 (2013.01); H02P 25/22 (2013.01); H02P 27/06 (2013.01); H02K 5/225 (2013.01); B66B 11/0438 (2013.01)

(58) Field of Classification Search
CPC .......... B66B 1/32; B66B 5/02; B66B 5/0031; B66B 1/30; B55B 1/32
USPC .................................. 187/250, 276, 277, 288
See application file for complete search history.

(56) References Cited

U.S. PATENT DOCUMENTS 4,457,237 A * 7/1984 Theurer et al. ................... 105/61
5,014,823 A * 5/1991 Pelto-Huikko ................ 187/275

(Continued)

FOREIGN PATENT DOCUMENTS

CN         1674407         9/2005
DE         33 32 515 A1    3/1985

(Continued)

OTHER PUBLICATIONS

Machine translation JP05193858A.*

*Primary Examiner* — Kawing Chan
(74) *Attorney, Agent, or Firm* — Shlesinger, Arkwright & Garvey LLP (57) ABSTRACT

A method for monitoring a brake which is operated by a spring force and a device for monitoring the force, comprising the steps of taking into account a force which is required to load or bias at least one spring by means of the device for monitoring the force.

15 Claims, 5 Drawing Sheets

(51) Int. Cl.
*H02K 5/22* (2006.01)
*B66B 11/04* (2006.01)
*H02K 3/28* (2006.01)
*H02K 11/00* (2006.01)

(56) References Cited

U.S. PATENT DOCUMENTS

| | | | |
|---|---|---|---|
| 5,048,644 A * | 9/1991 | Pelto-Huikko | 187/275 |
| 5,148,893 A | 9/1992 | Vertesy et al. | |
| 5,255,760 A | 10/1993 | Lamb et al. | |
| 5,265,701 A | 11/1993 | Ogasawara et al. | |
| 5,323,878 A | 6/1994 | Nakamura et al. | |
| 5,353,895 A * | 10/1994 | Camack et al. | 187/369 |
| 5,377,788 A | 1/1995 | Biewald et al. | |
| 5,377,923 A * | 1/1995 | Matsui et al. | 242/128 |
| 5,425,615 A * | 6/1995 | Hall et al. | 414/545 |
| 5,535,622 A * | 7/1996 | Walter | 73/121 |
| 5,693,919 A | 12/1997 | Sager et al. | |
| 5,744,882 A | 4/1998 | Teshima et al. | |
| 6,281,676 B1 | 8/2001 | Ottesen et al. | |
| 6,306,058 B1 | 10/2001 | Meitin et al. | 475/52 |
| 6,321,657 B1 * | 11/2001 | Owen | 104/119 |
| 6,371,254 B1 * | 4/2002 | Koshak | 188/67 |
| 6,965,179 B2 | 11/2005 | Willmer et al. | |
| 7,735,610 B2 * | 6/2010 | Huard et al. | 187/288 |
| 2003/0000279 A1 * | 1/2003 | Satou et al. | 72/441 |
| 2003/0080610 A1 * | 5/2003 | Jung | 303/9 |
| 2004/0074706 A1 * | 4/2004 | Ramseier et al. | 188/65.1 |
| 2004/0173413 A1 * | 9/2004 | Angst et al. | 187/287 |
| 2005/0023892 A1 * | 2/2005 | Claussen et al. | 303/119.1 |
| 2005/0023926 A1 | 2/2005 | Aulanko et al. | |
| 2006/0237265 A1 * | 10/2006 | Eckenstein et al. | 187/391 |
| 2006/0251513 A1 | 11/2006 | Kalavsky et al. | |
| 2007/0000302 A1 * | 1/2007 | Gramkow et al. | 73/1.71 |
| 2008/0116015 A1 * | 5/2008 | Fischer | 187/350 |
| 2008/0190706 A1 * | 8/2008 | Franklin | 187/251 |
| 2011/0011682 A1 * | 1/2011 | Erny et al. | 187/393 |

FOREIGN PATENT DOCUMENTS

| | | | |
|---|---|---|---|
| DE | 39 34 492 A1 | 4/1990 | |
| DE | 197 54 694 A1 | 6/1999 | |
| DE | 10 2004002570 | 8/2005 | |
| EP | 0 183 616 A2 | 6/1986 | |
| EP | 0 468 168 A1 | 6/1991 | |
| EP | 0603644 A1 | 6/1994 | |
| EP | 0671356 A1 | 9/1995 | |
| EP | 0678968 A2 | 10/1995 | |
| EP | 1 104 079 A2 | 5/2001 | |
| EP | 1 403 203 A1 | 3/2004 | |
| JP | 59213264 A | 12/1984 | |
| JP | 62 296752 | 12/1987 | |
| JP | 04 304142 | 10/1992 | |
| JP | 04 342893 | 11/1992 | |
| JP | H05043150 | 2/1993 | |
| JP | 05193858 A * | 8/1993 | B66B 5/02 |
| JP | H07285750 | 10/1995 | |
| JP | H09280282 | 10/1997 | |
| JP | 11 187613 | 7/1999 | |
| JP | 2000071852 A * | 3/2000 | |
| JP | 2004 072845 | 3/2004 | |
| JP | 2005 039932 A | 2/2005 | |
| JP | 2005-304119 | 10/2005 | |
| WO | WO 2004083650 A1 * | 9/2004 | |
| WO | WO 2004/110916 A2 | 12/2004 | |

* cited by examiner

ELEVATOR DRIVE

RELATED APPLICATIONS

This is a divisional application of application Ser. No. 12/225,163, filed Sep. 16, 2008, which is a national phase of PCT International Application No. PCT/EP2007/002251, filed on Mar. 14, 2007, claiming the priority benefit of EPC 06 005 374.1, filed on Mar. 16, 2006, all of which are hereby incorporated by reference.

FIELD OF THE INVENTION

The invention relates to an elevator drive, to a terminal arrangement for an elevator machine, to a braking device for an elevator installation and to a rotor mounting for an elevator machine.

BACKGROUND OF THE INVENTION

In known elevator drives, these drives are operated with a converter which is appropriate for their power or rating. This means that one converter is used for one elevator drive, respectively. For relatively high elevator ratings, provision is at the moment made for a plurality of drives which are each operated by one or more converters, to act on one motor shaft, or for a plurality of drives to move the elevator independently of one another, at the same time, and adjacent one another.

Indeed, it should be noted that converters with an appropriate rating are required for both low and high ratings. In this case, the cost ratio for converter ratings above a specific rating (>100 kVA peak output rating) rises more than proportionally, thus additionally increasing the costs for elevators of more than a specific elevator rating.

However, the conventional procedure is also problematic in terms of the availability of the elevator. Particularly in the high-rating range, availability of the elevator should always be ensured. In the event of faults or failures which are caused by a defective converter, the elevator will come to rest. This is also the case, for example, if the motor winding fails.

If a plurality of drives are acting on one shaft, this leads to a major increase in the physical length of the drive unit and therefore in the space required for the drive. It is therefore necessary to provide additional space in the machine room in order to satisfy this increased space requirement. For this purpose, the drives must be specially synchronized and there is a risk of the shaft being driven non-uniformly along its length.

SUMMARY OF THE INVENTION

This therefore results in the object of providing a drive for an elevator, and an electric motor for a drive such as this, which ensures fail-safe operation. A further aim is to reduce the production costs, particularly for drives with a high drive rating, in particular for a gearless elevator drive. Power losses during operation should be low, thus resulting in high efficiency.

The elevator drive according to the invention has an electric motor which is subdivided into a number of segments with each segment having an associated converter. This elevator drive is used, for example, for drives of more than 50 kW.

In one refinement, the elevator drive has an electric motor with a rotor and a stator, with the stator being subdivided into a number of segments, and with each segment having an associated converter. In this case, the rotor normally acts on one shaft. The motor principle is designed such that it is possible to operate an elevator direct drive using a plurality of converters. The winding structure of the stator winding is in this case designed such that a failure of one coil does not necessarily lead to a failure of the elevator installation.

In particular, the elevator drive according to the invention is in the form of a direct drive, and therefore is gearless. In contrast to funicular railway drives in which an epicyclical transmission/gear is normally used, this gearless drive is possible since the weight difference between the full elevator and the empty elevator is less than in the case of funicular railways.

The stator is typically subdivided into segments or sectors in the circumferential direction.

A synchronous motor with permanent-magnet excitation, for example a brushless synchronous motor is suitable as an electric motor for the drive. The rotor is therefore fitted with a number of permanent magnets.

Each coil of the stator winding is preferably in a concentrated form. Each winding in the stator may be in the form of a single-tooth winding. The individual coils of the stator winding can be connected in parallel or in series to form a winding phase.

In one refinement of the invention, the individual segments are galvanically isolated from one another. The flux produced by the permanent magnets is typically guided via pole shoes.

The arrangement of the magnets in the rotor together with pole shoes arranged between them preferably form flux concentration for the magnetic flux.

The magnetic field of the individual segments preferably spreads out only in the area of the segment, and produces a torque in the individual segment.

The individual segments can be connected in parallel or in series with one another as required, depending on the requirement, and can then be operated using a converter.

The number of segments of the electric motor, in particular of a synchronous motor with permanent-magnet excitation, can be calculated using the following variables:

p=number of pole pairs
u=coil sides per groove and layer
m=number of phases
Q=number of slots The elevator drive according to the invention is designed such that it can be subdivided into individual segments, with each segment having an associated converter. Segmentation is possible in the case of a suitable choice of the ratio of magnet poles to stator slots in conjunction with a preferably concentrated winding which is also referred to as a single-tooth winding.

One segment typically comprises an independent m-phase system which is operated by one converter. This means that the total rating required by the elevator can be divided by the number of segments. Each individual converter need provide only this rating, reduced by the ratio of the total rating to the number of segments. This allows the drive, as well as all the components which are required in conjunction with the stator and the rotor, to be produced at a lower cost.

Furthermore, smaller converters can be operated more easily at higher switching frequencies, for example as far as possible above 8 kHz, so that the drive is quieter. The larger the converters, the greater the extent to which higher switching frequencies cause problems. Lower frequencies lead to louder motors. A further advantage of the segmented design of the motor of the elevator drive which is arranged adjacent to or in the elevator shaft in buildings and in the vicinity of rooms in which people live, is therefore the reduced noise developed.

The invention likewise relates to an electric motor and a drive machine for an elevator drive as described above.

The invention also relates to a segment for an electric motor, which segment represents at least one winding of a stator winding, in which case a converter may be associated with this segment. This segment can therefore be used in an electric motor according to the invention of an elevator drive according to the invention.

Furthermore, a stator is described having a stator winding which comprises a number of windings, with the stator winding being subdivided into segments and with each segment comprising at least one winding, and in which case a converter can be associated with each segment. This stator can therefore be used as a stator of an electric motor as described above, for the elevator drive, as explained above.

The invention also relates to a terminal arrangement for an electric motor of an elevator drive, in particular of an elevator drive of the type described above, and to an electric motor having a terminal arrangement such as this. The terminal arrangement explained in the following text can therefore be used for an electric motor as described above, but is not restricted to an application such as this.

According to the present-day prior art, gearless elevator drives are in the form of synchronous motors with permanent-magnet excitation. In this case, each individual motor winding must be formed from the stator and must be connected to terminals in order then to be passed from there as a motor connecting cable to individual frequency converters. A plurality of terminals and terminal boxes are therefore required on the motor. This is problematic particularly in the case of large motors, in which the cables, terminals and frequency converters to be used are difficult to handle because of the increasing size.

It should be noted that each individual terminal box can be closed so as to be touch-proof, in which case the motor windings which are passed out individually must be passed through the motor into the terminal boxes. The confusion between the connections increases with the number of windings passed out and with the number of motor connecting cables. Furthermore, in some cases, there is only limited accessibility to the terminal boxes, because of the large number of terminal boxes. Furthermore, the laying of motor connecting cables to the motor is complex and the physical space required for the motor is increased by the large number of terminal boxes.

This results in the problem of designing an electric motor and a motor housing such that a plurality of motor windings can be passed out at terminals and only a small number of terminal boxes are required in this case, such that only a smaller amount of additional physical space is required because of the multiplicity of terminals, and clarity is provided for the motor connecting cables. Furthermore, the access to the motor should not be restricted by motor connecting cables.

In consequence, the aim is to propose an electric motor, in particular a gearless motor, which can be produced and installed at low cost and in which the cabling and wiring can be implemented in a simple manner.

The proposed electric motor is intended for an elevator drive, in particular for an elevator drive of the type described above. This has a motor housing and a number of motor windings which are connected to at least one terminal, with ribs or webs between which the at least one terminal, normally a plurality of terminals, is or are arranged being arranged on the motor housing.

The described electric motor is used in particular for driving elevators whose cab or car is connected via supporting means to a counterweight, for example as in the case of cable elevators (traction drive elevators).

The motor housing of the electric motor which in particular has a plurality of motor windings, is designed such that a type of cable duct is formed between two ribs of the motor housing. This area is preferably formed on both sides of the motor such that the terminals and the motor windings that are passed out can be laid and secured therein, that is to say between the two ribs or webs. The required protection against touching the connecting terminals can therefore also be achieved by a small number of simple sheet-metal covers. By way of example, the motor connecting cable is passed out downward and can be passed from there directly into a cable duct without having to restrict the accessibility to the motor. The accessibility to the possibly large number of terminals can be achieved just by removing a small number of covers.

The proposed electric motor is preferably in the form of a synchronous motor with a rotor and a stator, with the stator windings being connected to the at least one terminal.

It is possible to arrange the ribs in the circumferential direction. Furthermore the profile of the ribs should not exceed a predetermined height above the housing surface.

It is possible to arrange the ribs in circumferential direction. Further, the ribs should not exceed a predetermined height above the housing surface over their course or profile.

It is possible to provide for a plurality of terminals to be arranged between at least two ribs. Furthermore, the terminals can be arranged adjacent one another between the ribs, and/or one behind the other in the circumferential direction.

In one refinement, the connections of the motor windings are likewise arranged between the ribs.

In the case of the described electric motor, it is possible to provide for motor connecting cables to lead downward away from the terminals out of the motor area. In this case, the motor connecting cables are preferably passed out of the motor area alongside one another.

Furthermore, the edges of at least two adjacent ribs and which are pointing away from the motor housing are connected to one another by a cover.

It is possible that the ribs are used as supporting ribs in order to make the housing robust, and to have suitable dimensions and to be arranged in a suitable manner for this purpose.

The motor housing according to the invention has ribs between which at least one terminal is arranged. In particular, this motor housing is suitable for electric motors of the type described above.

The invention provides that a motor for an elevator drive is subdivided into a plurality of segments, with at least one motor winding in each case being provided for each phase. The segments are connected by cables to terminals, and the motor housing typically has ribs in the circumferential direction on its outside, with at least two ribs forming a space between them in which the terminals, the cables of the motor windings and the motor connecting cables can be accommodated.

The ribs should be designed such that they are not lower than a defined rib height along a predetermined rib length, and a type of cable duct is formed in the intermediate space between two ribs of the motor housing. This area is optimized, in particular on both sides of the machine, such that the terminals and the motor windings that are passed out, and their connections can be laid and mounted between the ribs.

A closed installation area for the cables and terminals can be formed, and the required touching protection for the connecting terminals can be achieved by a small number of simple sheet-metal covers which can be attached to the ribs.

The motor connecting cables which are required to supply power to the motor are passed out, for example in the lower motor area, and can be passed directly from there into a cable duct, without a confusion of cables restricting the accessibility to the machine. Cables can be fed in from one side, and can be fed out on the other side.

This makes it possible to close each individual terminal box such that it is touch-proof. It should be noted that the individual motor windings which are passed out of the motor and the stator must be passed through the motor into the terminal boxes. The clarity is not restricted by the proposed arrangement of the connections and the windings that are passed out, as well as the number of motor connecting cables. The accessibility to the terminal boxes is excellent, even when there are a multiplicity of terminal boxes.

The laying of motor connecting cables to the motor has been found to be a simple activity. Furthermore, the physical space required for the motor is not increased by the terminal boxes.

In the case of elevators, particular importance is attached to monitoring of the brakes. Spring fracture monitoring for safety brakes operated by spring force is described in the following text. This principle can be used for an elevator drive and an electric motor for elevator drives of the type described above.

The principle of brakes operated by spring force as a safety component is known from the prior art. In this case, a spring which is biased electromechanically, hydraulically or in some similar manner is used in the event of braking in order to cause the spring force to act as a braking force via brake linings or other devices on brake disks, brake drums or similar devices. Since the energy to bias the spring often has to be kept available all the time, this inevitably leads to operation of the brake in the event of a power failure, and this is known by the expression "fail safe".

These brakes operated by spring force have a wide field of use. They are used wherever drives must be braked or held. Brakes operated by spring force such as these are used, for example, for elevator drives, funicular railway drives, funfair ride concerns, and wind power installations, etc. In these fields of application, brakes operated by spring force carry out safety tasks. By way of example, the installation must be brought to rest quickly during operation or, in the event of an emergency, the complete installation must be braked and brought to rest in order to avoid danger to people or the installation.

The described brake principle has disadvantages, however, when subject to certain preconditions. The springs which are used as spiral springs or cup-type springs and are used individually or in a pack can fracture or become soft, and the force they produce can thus decrease. The condition of the brake and of the braking springs must therefore be regularly checked. If the springs, which are kept biased, or else the spring packs are covered by housings or other machine parts, or cannot be seen from the outside, the condition of the springs cannot be identified visually. Frequent operation of the brake, for example as a brake blocking function during operation, occurs when the installation is in operation briefly and must then be fixed again in a different state.

Particularly in elevator operation a blocking brake such as this is in action during each individual movement. In every stopping position at which the elevator stops, the elevator cab is held by a brake such as this via its drive. In this case, when stopping during operation of the stopping points, the elevator car is in many elevator installations not held directly by the brake but indirectly by the brakes acting on the cables, on the traction sheave or on the drive. The brake is released again at the start of movement, as a result of which a very high number of switching operations in terms of brake closing and opening can be reached over the life of the brake, as a result of which the springs or the spring packs can fail as a result of repeated stress failure, material fatigue or the like over the course of time. If the springs are now also installed in a housing or the like, it is extremely difficult to identify a failure such as this of an individual spring in this spring pack. However, this is unacceptable from the safety point of view since failure of one spring or of a plurality of springs in a pack leads to loss of braking power or even to complete failure of the braking power.

In the case of brakes which are operated by spring force and are hydraulically ventilated, the spring installation is very frequently concealed or hidden, since the spring pack composed of cup-type springs is installed in brake calipers or in a corresponding apparatus, and the hydraulic areas must be designed to be liquid-tight. In order to allow the failure of an individual spring in a pack to be identified, the complete brake caliper must be dismantled, and this leads to relatively long interruptions in operation.

This results in the object of ensuring safe and rapid detection of spring fracture or other spring failure in braking springs, particularly in the case of safety-brake springs which are installed in housings or are concealed, that is to say which cannot be monitored visually.

The method according to the invention is used for monitoring a brake which is operated by spring force, taking into account a force which is required to load or bias at least one spring and the amount of force required for this purpose.

It is possible to take account of the force which is required for the at least one spring to reach a limit position. This limit position can be checked by means of a device limit which is provided.

The at least one spring can be loaded or biased electromechanically, electrically, mechanically, pneumatically or hydraulically. By way of example, spiral springs or cup-type springs may be used as the springs. The springs may be individual springs, or springs combined in packs.

In the case of a hydraulically ventilated brake, for example, an oil-pressure/time profile is detected. The hydraulic pressure in the hydraulic oil system is in this case preferably checked indirectly or directly via suitable devices.

The described method is used, for example, in an elevator drive or using an electric motor as disclosed herein.

The described method is therefore based on identification of failure of one or more springs without visual inspection during operation. To this end, the brake is typically monitored via appropriate switches and sensors, and the monitoring is appropriately evaluated via a control system. Any defect which occurs can thus be identified in good time, and a warning or a message can be produced. Those springs which are no longer serviceable can be replaced before a malfunction occurs.

It is assumed that springs which have failed partially or individually as a result of failure require a different amount of force, normally less force, to bias them. In the case of a hydraulically ventilated brake, this reduced opening force can be detected, for example, via the oil-pressure/time profile. In this case, the current oil pressure is preferably measured, using an oil pressure gauge, in the immediate vicinity of the supply line to the brake caliper. In addition, when the biased spring is in the limit position, this limit position is identified via contacts or suitable devices. This then results in a logical link between these two events for identification of a failure or partial failure of a spring.

When the limit position of the spring is detected in a normal situation, the signal of the maximum hydraulic pressure that is reached is always indicated first, and then the limit position signal of the spring. However, when a spring fracture occurs, a reduced oil pressure is in its own right sufficient to move the spring to the limit position and to open the brake, thus resulting in the limit position signal being produced at a time before the maximum oil pressure signal. This monitoring can be adjusted, for example, by appropriate choice of the setting value of a pressure sensor. The set pressure value to be monitored must be less than the oil pressure which is at least normally required to open the hydraulic brake during operation. These signals can now be evaluated by an analogue or digital control system, which then produces the result "OK" or "spring fracture".

The brake can be monitored continuously by regular tests at short or relatively long intervals. Alternatively, the evaluation can be carried out on each operation of the brake.

In addition to the hydraulic loading of the spring and the monitoring of the oil pressure, and possibly of the time required to reach the pressure, it is also possible to use and monitor some other biased force. For example, the spring can be biased pneumatically, or else electrically by means of solenoid coils. In this case, the electrical values which occur are compared with corresponding predetermined values. "OK" or "alarm" can then be indicated during further calculation and comparison with the limit position monitoring.

The braking device according to the invention is used in an elevator installation and is operated by spring force. The braking device is used in particular to carry out a method as disclosed herein. This braking device is provided with a device for monitoring a force which is required to load or bias at least one spring.

The braking device is operated by spring force, with a friction lining being pressed against a braking surface, for example by means of at least one spring, and with a braking force being produced in the process.

This braking force decelerates the braking surface which is moved translationarily or rotationally with respect to the brake lining.

If the spring limit position is monitored, it is possible to compare the determined values with predetermined values. If predetermined limit values are overshot or undershot, "alarm" is produced.

The monitoring of the limit position of the biased spring and the monitoring of the biasing of the spring typically results in values which can be processed and compared with one another and with a time sequence of their occurrence.

In one refinement of the method and of the braking device, the checking of the limit position of the biased spring and the biasing pressure, for example of the hydraulic biasing pressure, is linked to logic or a corresponding device, and is compared with predetermined values. A spring fracture is identified in the event of any discrepancy from predetermined values.

In principle a force to be applied and/or a time to be used can be used for monitoring the biasing of the spring. The limit position of the biased spring can be checked either directly at the spring elements or indirectly via elements which are connected indirectly or directly thereto. In this case the limit position can be determined by means of any type of device or devices. By way of example, the hydraulic pressure in a hydraulic oil system can be checked indirectly or directly by means of any suitable devices.

If the described braking device, for example a drum brake, is used in a floating housing, it is necessary to produce an opposing force during braking.

The proposed elevator drive has a braking device, as explained above, in particular in order to carry out a method as disclosed herein.

An electric motor is also proposed for an elevator installation, a rotor for the electric motor and a rotor mounting. The features explained in the following text can also be combined in any desired manner with the embodiments described above.

Nowadays, it is normal for elevator direct drives (gearless drives) to be in the form of synchronous machines with permanent-magnet excitation. In machines such as these, the rotor is fitted with permanent magnets on its surface facing the stator. This means that the surface of the rotor is permanently magnetic.

The rotor is normally fitted to the motor shaft by an interference fit, that is to say it is pushed onto the shaft with a large amount of force being applied in the axial direction, with the hub being widened, and with the necessary connecting force being produced in this way. The rotor is then introduced, together with the motor shaft, into the motor housing with the stator. During assembly, that is say during insertion of the rotor into the stator, this results in considerable complexity for the apparatus, since the rotor must not touch the stator, and only a very small air gap is provided between the rotor and the stator. This is particularly evident when the motor has large dimensions.

In the case of large elevator drives, the motor shaft is normally aligned horizontally during operation since the traction sheave, which is mounted on the motor shaft in addition to the rotor, is then arranged such that the cables run over the traction sheave, coming from underneath, and are passed downward again. The loads which are transmitted to the traction sheave by the cables can then be transmitted essentially vertically to the motor shaft, and then further on, for example, to two shaft bearings.

The conventional procedure has a number of inherent disadvantages. For example, in order to fit the rotor, the motor housing must be tilted such that the motor shaft points vertically upward in order that the natural weight of the rotor has a stabilizing effect on the apparatus. In this case, a mandrel must be attached to the motor shaft, as part of the apparatus.

Furthermore, the dependency on the manufacturing tolerance of the components used can be seen in the exact position of the rotor with respect to the stator core. The exact position of the rotor with respect to the stator core is important for the electrical rating of the drive. Furthermore, because of the interference fit, the rotor can be replaced only with the motor shaft.

Particularly in the case of large rotors, the magnet area results in a magnetic force, that is to say of considerably more than 1000 kg, acting transversely with respect to the axis, which, in the case of fitting or removal when there are small distance differences to surfaces, for example stator surfaces, located in the vicinity, attempts to place the magnetic area against the opposing area located closer, with the magnets and the laminated core of the stator easily being damaged, and making further rotor positioning more difficult.

This therefore results in the object of proposing a motor in which a rotor, in particular a rotor with permanent magnets, can easily be installed in a motor housing with a stator. For this purpose, it is helpful if the rotor can be installed in the horizontal position. During the installation process, it is expedient for it to be possible to move the rotor on the shaft and thus to position it exactly on the shaft. Furthermore, it should be simple to remove the rotor, and for it not to come into contact with the stator during fitting and during removal.

The described electric motor is used for an elevator installation and has a stator and a rotor which is mounted floating on a rotor shaft with a rotor hub and is attached by means of a clamping element.

In consequence the electric motor or the elevator drive is designed such that the rotor is mounted in a floating manner on the shaft. The connection between the rotor hub and the motor shaft is made via the clamping element, which is preferably an integral or multi-part, or split, shrinking disk. This results in the capability to move the rotor on the shaft during fitting, in order to allow exact positioning. Once the clamping element has been released, the rotor can be removed again. The clamping element can, for example, be clamped and released from the side of the rotor facing away from the motor bearing. By way of example, it can be clamped and released by means of screws distributed around the shaft.

If the clamping element comprises a two-part shrinking disk, the two parts may have conical areas which face one another, with the inner surface, facing the shaft, being cylindrical. In this case, the rotor is provided in the area of the shaft with a hub which has a cylindrical surface area on the side remote from the shaft.

The natural weight of the rotor is supported by the shaft. The rotor can thus be pushed into the motor by means of a simple apparatus which is attached to the motor shaft via threaded rods and a pressure plate. The exact guidance by means of the shaft prevents the rotor from touching the stator.

The described electric motor is particularly suitable for elevators whose cab is connected via supporting means to a counterweight, for example as in the case of traction drive elevators.

As explained, the clamping element is preferably formed by at least one shrinking disk. It is possible to provide for one shrinking disk to be arranged at each of the two axial ends on the rotor hub.

The rotor is typically mounted on the shaft with a rotor hub, with the shaft being cylindrical in the area of the rotor hub. The rotor hub may have an outer area which is conical.

The proposed electric motor can be used in conjunction with an elevator drive as described above. In addition, the electric motor may have the features as explained above of the electric motor and a braking device as disclosed herein.

The rotor according to the invention is used in such an electric motor.

The described elevator drive is designed such that the rotor is mounted in a floating manner on the shaft. The shaft is cylindrical in the area of the rotor hub. When the rotor is being fitted, the shaft has already been finally fitted in its two bearings, and has therefore been stabilized in the radial direction.

The rotor is mounted on the shaft with the rotor hub, whose surface facing the shaft is likewise cylindrical. To this end, the hub may have an outer area which is in the form of a cone or is conical. Alternatively, a ring is arranged on a hub which is likewise cylindrical on the outside, with the external contour of the ring being conical. The connection between the rotor hub and the motor shaft is made via the clamping element, which is likewise conical on its side facing the shaft and either is directly on the hub surface or, together with the first ring, forms a so-called shrinking disk.

By way of example, the shrinking disk is arranged on that surface of the hub which is remote from the shaft and, during tightening, the outer cone, which is formed on a clamping element, is drawn in the axial direction over the inner conical ring, which is arranged on the hub, and thus compresses the hub. The stress can in this case be applied with the aid of screws which are arranged all around the shaft.

A shrinking disk can be arranged at each of the two axial ends on the hub, and these disks are drawn toward one another by the screws. Alternatively, only one shrinking disk is provided, and is drawn against the hub disk with the aid of the screws.

Until the screws have been correctly tightened, the rotor can be moved on the shaft and can thus be moved to the desired exact position. Once the clamping element has been released, the rotor can be removed again.

It should be noted that, during the insertion of the rotor into the stator and the exact axial position with respect to the stator, the natural weight of the rotor is already supported by the shaft, which is arranged in its bearings. The precise guidance of the shaft prevents the rotor from touching the stator. Particularly in the case of large rotors with a natural weight of several hundred kilograms, it is advantageous to push the rotor into the motor, or to safely pull it out of the motor again during removal, with the aid of a simple apparatus with a pressure plate which is attached to the end face of the motor shaft via threaded rods.

Further advantages and refinements of the invention will become evident form the description and the attached drawing.

It is self-evident that the features mentioned above and those which are still to be explained in the following text can be used not only in the respectively stated combination but also in other combinations or on their own without departing from the scope of the present invention.

BRIEF DESCRIPTION OF THE DRAWINGS

The invention will be described in detail in the following text with reference to the drawing, which schematically illustrates exemplary embodiments.

DETAILED DESCRIPTION OF THE INVENTION

Figure 1:
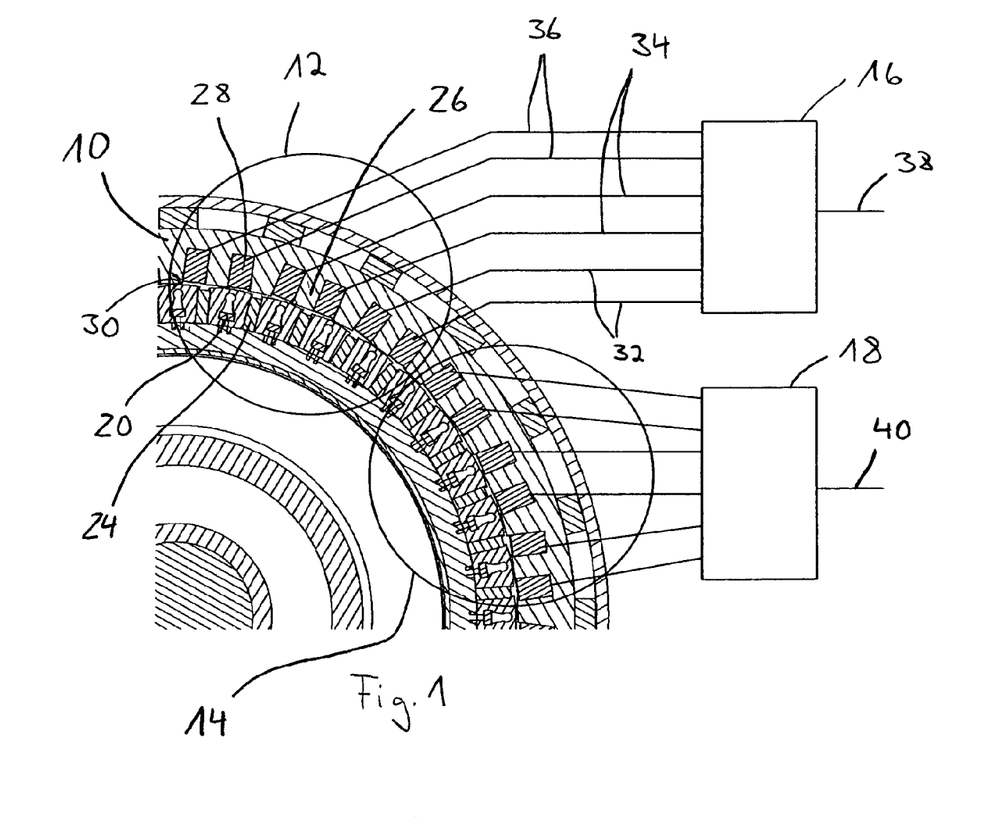
FIG. 1 shows a detail of one embodiment of the stator according to the invention.

FIG. 1 shows a detail of a stator which is annotated overall with the reference number 10. The illustrated detail shows, within a frame, a first segment 12 and a second segment 14. In this case, a first converter 16 is associated with the first segment 12, and a second converter 18 is associated with the second segment 14.

In the first segment 12, pole shoes 20, magnets 24, stator teeth 26 and coils 28 can be seen. These coils are, for example, formed with a concentrated winding as a so-called single-tooth winding. The illustration also shows a stator slot 30.

The first segment 12 is connected via six cables to the first converter 16, with cable 32 carrying phase one, cable 34 carrying phase 2, and cable 36 carrying phase 3. The first converter 16 is connected via a first connection 38 to the elevator control system, and the second converter 18 is connected in the same way via a second connection 40 to the elevator control system.

The second segment 14 is a very small motor segment with three phases, and in each case one coil for one phase. However, it is possible to implement different splits of the windings into segments and different interconnection options for the segments to one another. For example, one phase may comprise a plurality of stator teeth or else a plurality of very small segments may be associated with one converter.

Figure 2:
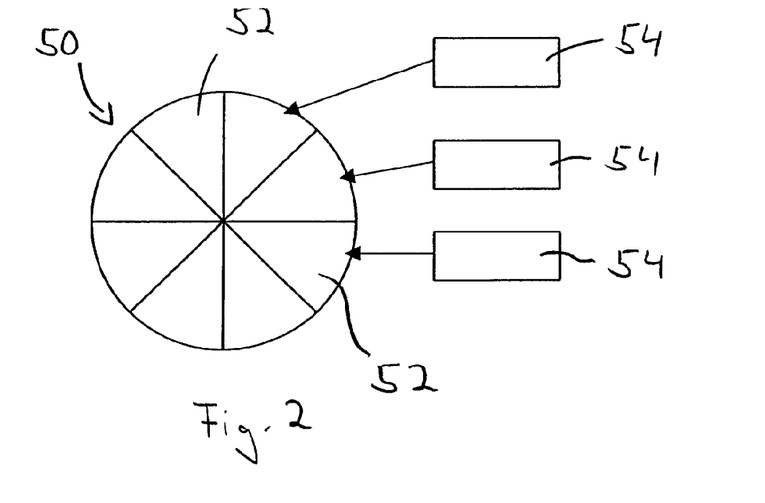
FIG. 2 shows in schematic manner the subdivision of a stator into a plurality of segments.

FIG. 2 illustrates the principle of the splitting according to the invention of a stator winding into segments, and the association of segments with converters. This shows a schematically illustrated stator 50, which is subdivided into eight segments 52. Each of these segments 52 is associated with one converter 54, with only three converters 54 being shown in the illustration, for clarity reasons.

Figure 3:
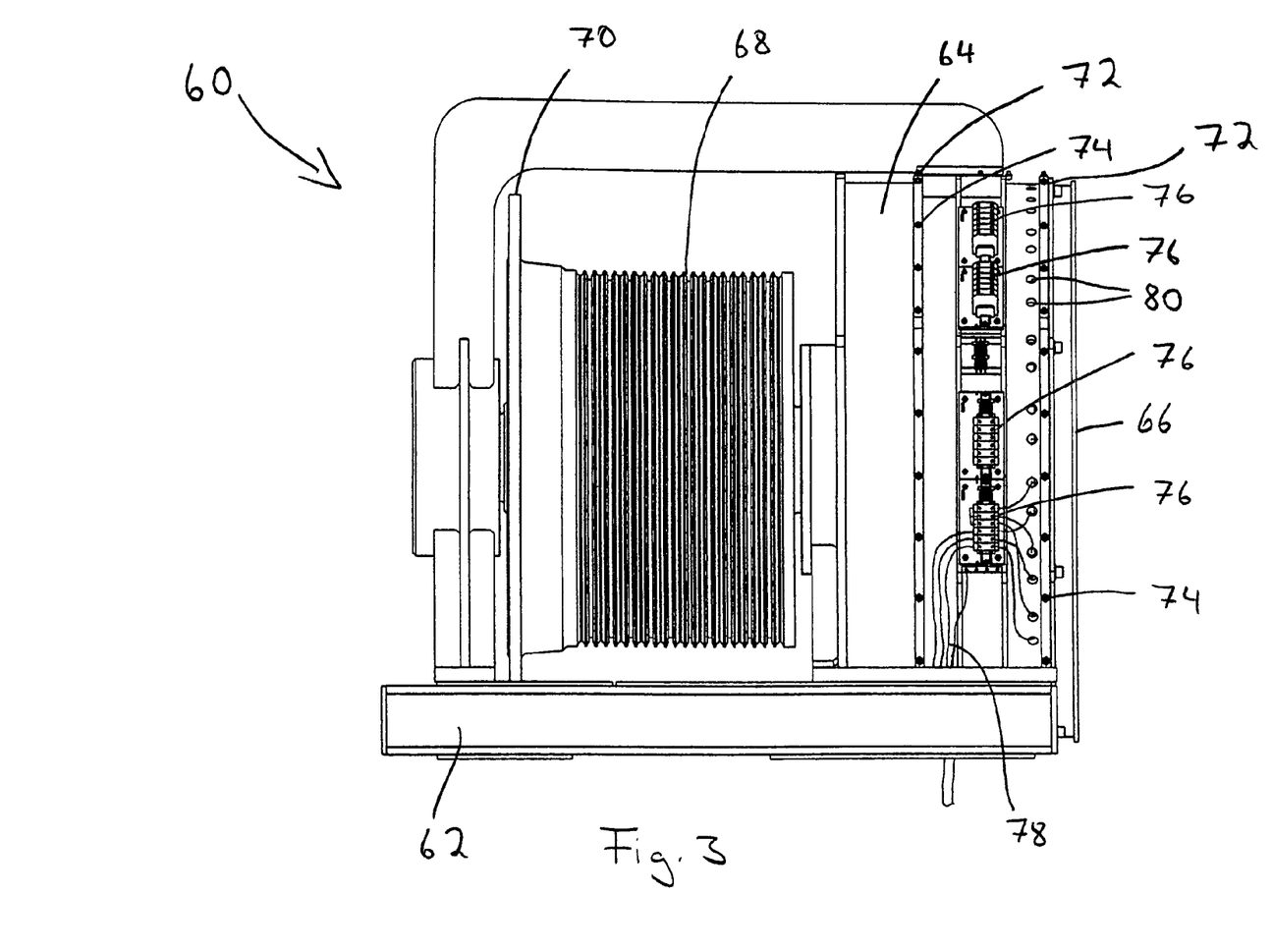
FIG. 3 shows one embodiment of the electric motor according to the invention, illustrated in a simplified form in order to show a terminal arrangement.

FIG. 3 shows a simplified illustration of an electric motor 60. The illustration shows a machine frame 62, a stator housing 64, a rotor cover 66 and a traction sheave 68 with a brake disk 70.

Furthermore, two ribs 72 are illustrated, in which attachment points 74 for a cover are located.

Furthermore, FIG. 3 shows four terminals 76 which are arranged between the two ribs 72 and are preferably each provided for one segment. Motor connecting cables 78 connect the terminal 76 to the converters.

Aperture holes 80 are provided in the stator housing 64 for the cabling of the coils. The cables of the coils are passed through these aperture holes 80.

Figure 4:
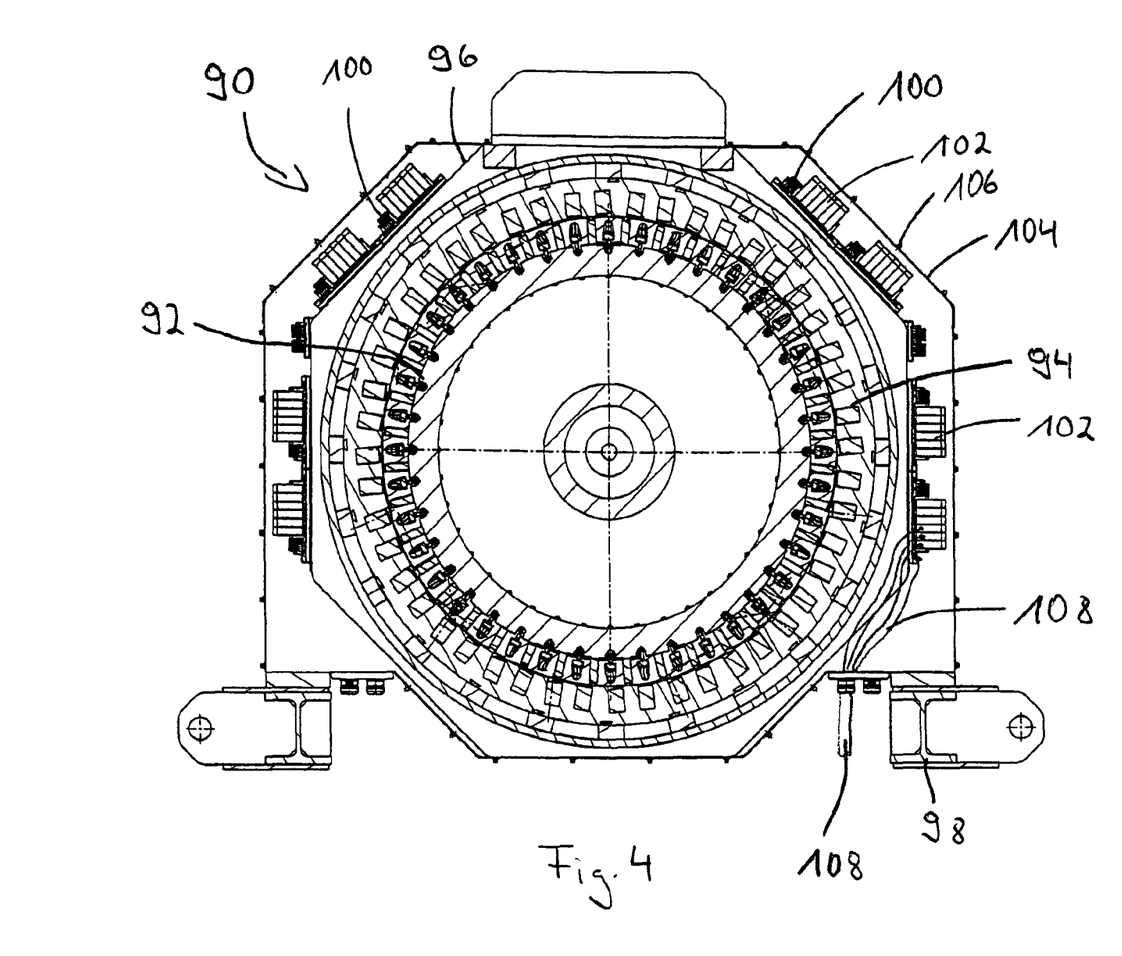
FIG. 4 shows a simplified illustration of an electric motor, in the form of a plan view.

FIG. 4 shows a simplified illustration of an electric motor for an elevator drive, which is annotated overall with the reference number 90. The electric motor 90 comprises a rotor 92 and a stator 94, a motor housing 96 and a machine frame 98. The rotor 92 is mounted, in the form of an internal rotor, in the stator 94 such that it can rotate.

Ribs or supporting ribs 100 are arranged on the motor housing 96, with terminals 102 being provided between the ribs 100. A terminal area cover 104 having attachment points 106 is located above this. Motor connecting cables 108 are the cables for connecting the terminals 102 to the converters.

Figure 5:
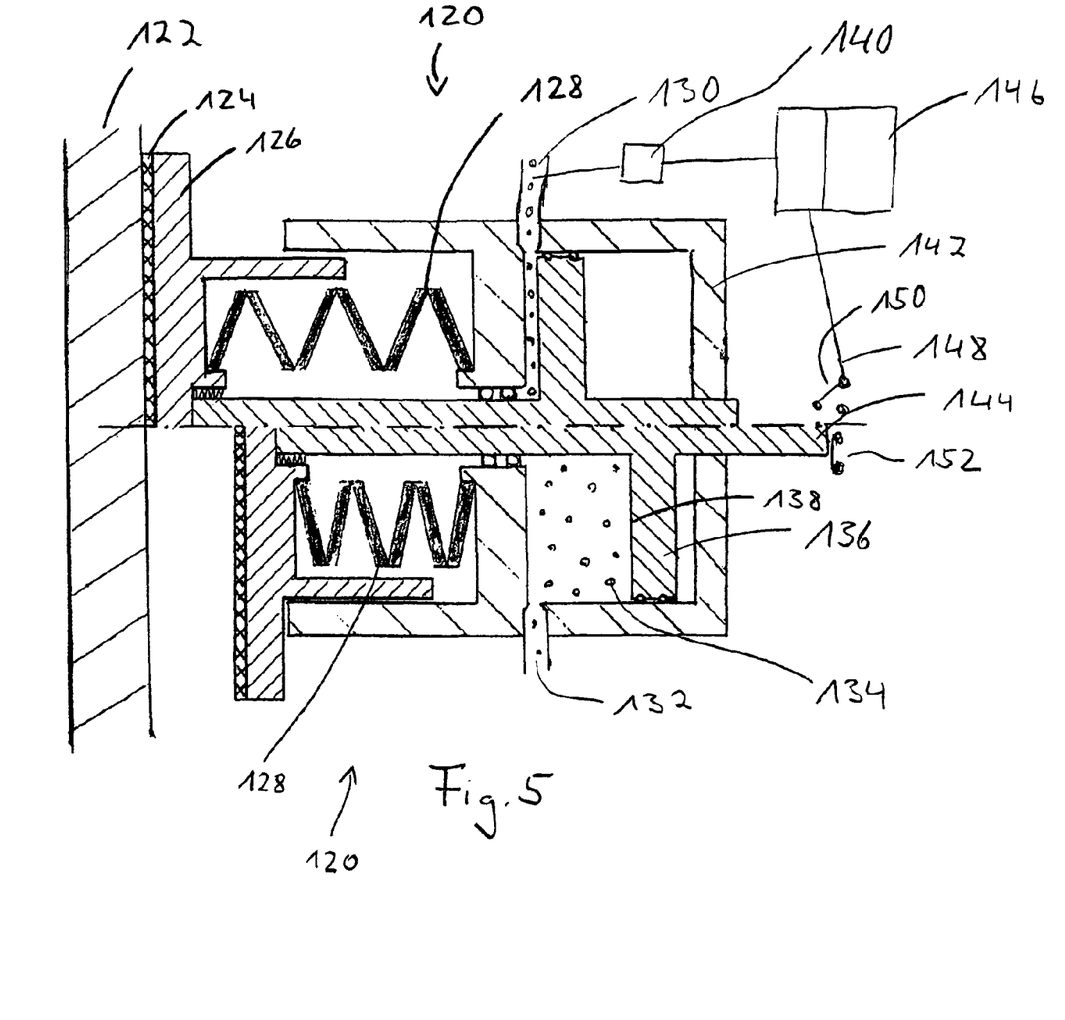
FIG. 5 shows a schematic illustration of a brake with hydraulic brake ventilation.

FIG. 5 shows, schematically, a brake 120 with hydraulic brake ventilation, with the brake 120 being illustrated in the braking state during operation in the upper half and in the ventilated state in the lower half.

The illustration shows a brake disk 122, a brake lining 124, a pressure plate 126, a spring 128, an oil line 130 for feeding in and feeding out, an inlet flow 132 for a pressure medium 134, for example a hydraulic oil, a piston 136 with a piston surface 138, an oil-pressure monitor 140, a housing 142 and a pushrod 144.

In the upper half of the illustration, the brake lining 124 is resting on the brake disk 122. The spring 128 is in the released state. No braking is taking place in the lower half, and the spring 128 is in the biased state.

In order to monitor the brake 120, a device 146 is provided in order to monitor the time profile of the oil pressure. This device 146 can likewise read and evaluate the signal of a limit position switch 148. In the upper half, the switch is open 152, and in the lower half it is closed 152. A check is now carried out in this position to determine whether the amount of force required to reach the limit position corresponds to a predetermined value.

Figure 6:
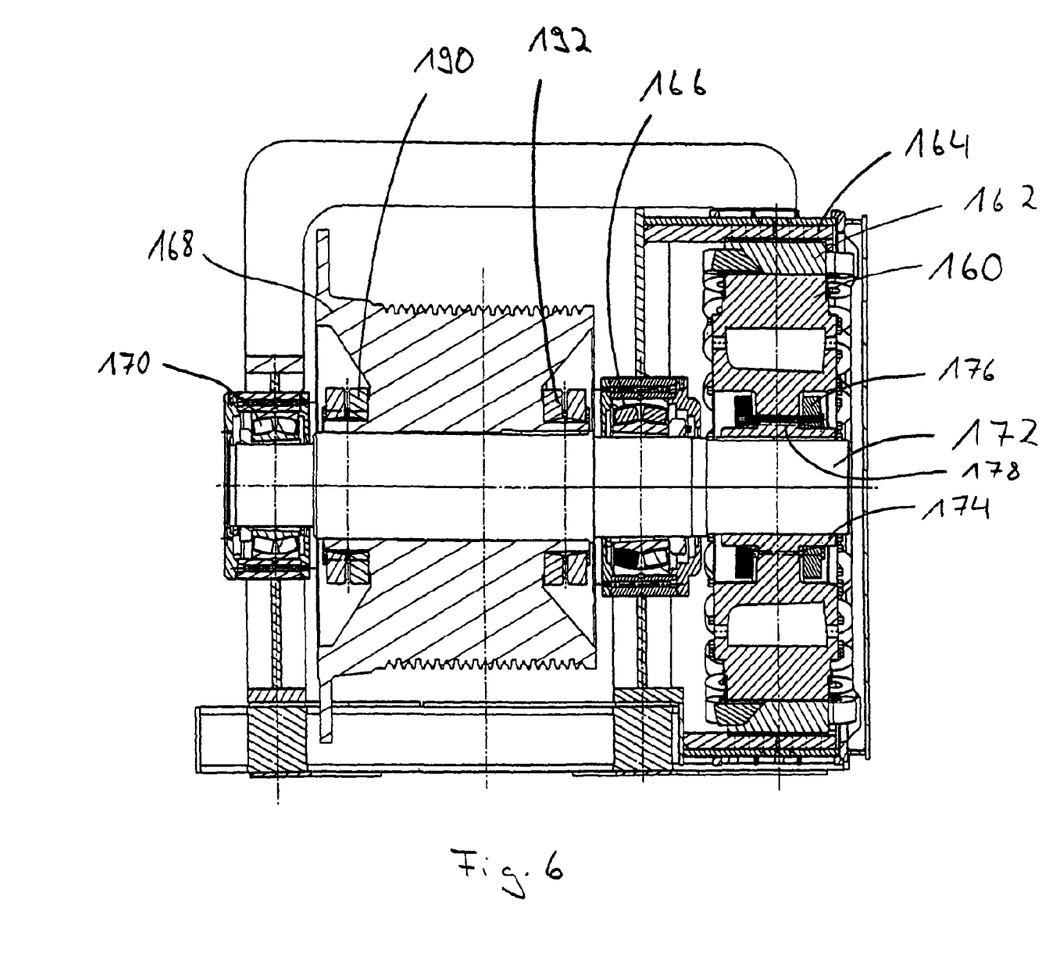
FIG. 6 shows a rotor mounting according to the invention.

FIG. 6 shows a simplified illustration of a rotor mounting according to the invention. The illustration shows a rotor 160 mounted in a floating manner, a stator 162, a motor housing 164, a drive-end bearing 166, a traction sheave with a brake disk 168, a non-drive-end bearing 170 and a shaft 172 on which the rotor 160 is mounted. While being fitted, the rotor 160 is pushed onto the shaft 172 in the horizontal direction, and can then be positioned exactly, held by the shaft 172.

The rotor hub 174 of the rotor 160 surrounds the shaft 172, wherein the rotor can be braced by means of a clamping element 176 with clamping screws 178 and can therefore be firmly mounted on the shaft 172. Once the clamping element 176 has been released, the rotor 160 can be moved along the shaft 172 and can thus be positioned or removed, with the dead weight of the rotor 160 being held by the shaft 172.

The traction sheave 168 can likewise be mounted on the shaft by means of clamping elements 190 and 192. This makes it possible to easily fit and remove the traction sheave 168, in the same way as the rotor 160. The present application therefore describes an electric motor in which the rotor 160 and the traction sheave 168 can be attached by means of clamping elements, which may be in the form of an integral, two-part or split shrinking disk.

An electric motor is also disclosed in which only the traction sheave can be attached by means of a clamping element, for example by means of at least one shrinking disk.

The invention claimed is:

1. A method for monitoring a brake which is operated by a spring force, comprising the steps of:
    taking into account a value which is required to load or bias at least one spring to a biased state, the biased state corresponding to a limit position;
    indicating when the at least one spring reaches the limit position; and
    comparing the value required to reach the limit position with a predetermined value.

2. The method as claimed in claim 1, wherein the taking into account a value includes taking into account a force which is required for the at least one spring to reach the limit position.

3. The method as claimed in claim 2, wherein the brake is a hydraulically ventilated brake having an oil-pressure/time profile and further comprising the step of detecting or checking the profile in the limit position whether the force required to reach the limit position corresponds to a predetermined value.

4. The method as claimed in claim 3, and further comprising the step of checking an oil pressure in the hydraulically ventilated brake directly or indirectly.

5. The method as claimed in claim 1, and further comprising the step of checking the limit position by means of a device.

6. The method as claimed in claim 1, wherein loading or biasing the at least one spring is implemented electromechanically, electrically, mechanically, pneumatically or hydraulically.

7. The method as claimed in claim 1, and further comprising the step of using the method on an elevator drive or an electric motor.

8. The method as claimed in claim 1, wherein the step of indicating is implemented with a limit switch.

9. A braking device for an elevator installation, comprising:
    at least one spring for providing spring force for operating the braking device;
    a device for monitoring a value which is required to load or bias the at least one spring to a biased state, the biased state corresponding to a limit position;
    an indicator coupled to the device to indicate when the at least one spring reaches the limit position; and
    the device is configured to compare the value at the limit position with a predetermined value.

10. The braking device as claimed in claim 9, wherein the value is a force which is required to load the at least one spring to the biased state.

11. The braking device as claimed in claim 9, wherein:
the brake is hydraulically ventilated; and
the value is oil pressure required to load the at least one spring to the biased state.

12. The braking device as claimed in claim 11, wherein the brake includes an oil-pressure/time profile; and
the device is configured to check the profile at the limit position for oil pressure required to load the at least one spring to the biased state.

13. The braking device as claimed in claim 12, wherein the device is configured to check the profile for time required for the at least one spring to reach the limit position.

14. The braking device as claimed in claim 9, wherein the indicator includes a limit switch.

15. An elevator drive, comprising:
a braking device comprising at least one spring for providing spring force for operating the braking device;
a device for monitoring a value which is required to load or bias the at least one spring to a biased state, the biased state corresponding to a limit position;
an indicator coupled to the device to indicate when the at least one spring reaches the limit position; and
the device is configured to compare the value at the limit position with a predetermined value.

* * * * *